United States Patent [19]
Somers et al.

[11] Patent Number: 6,036,420
[45] Date of Patent: Mar. 14, 2000

[54] CAPPED WHEEL NUT ASSEMBLY

[75] Inventors: Steven D. Somers, Tiffen; Clifford A. Margraf, Tiffin, both of Ohio

[73] Assignee: Horizon Technology, LLP, Tiffin, Ohio

[21] Appl. No.: 09/399,851

[22] Filed: Sep. 21, 1999

[51] Int. Cl.[7] .................................................. F16B 37/14
[52] U.S. Cl. ........................... 411/430; 411/429; 411/375
[58] Field of Search ..................... 411/429, 430, 411/372.5, 372.6, 375, 376, 371.1, 542

[56] References Cited

U.S. PATENT DOCUMENTS

| | | | |
|---|---|---|---|
| 4,710,082 | 12/1987 | Curtis | 411/373 |
| 4,764,070 | 8/1988 | Baltzell et al. | |
| 4,784,555 | 11/1988 | Cantrell | 411/373 |
| 5,006,026 | 4/1991 | Estrada | 411/542 |

FOREIGN PATENT DOCUMENTS

| | | | |
|---|---|---|---|
| 153487 | 9/1985 | European Pat. Off. | 411/429 |
| 2113337 | 8/1983 | United Kingdom | 411/375 |

*Primary Examiner*—Flemming Saether
*Attorney, Agent, or Firm*—Reising, Ethington, Barnes, Kisselle, Learman & McCulloch, PC

[57] ABSTRACT

A capped wheel nut assembly in which a cap is sleeved over a nut. The cap has an outwardly flared marginal portion at the open end crimped over a circular enlargement on the nut. An O-ring seal is compressed between the marginal portion of the cap and the circular enlargement of the nut, to prevent the entry of moisture between the cap and the nut.

4 Claims, 1 Drawing Sheet

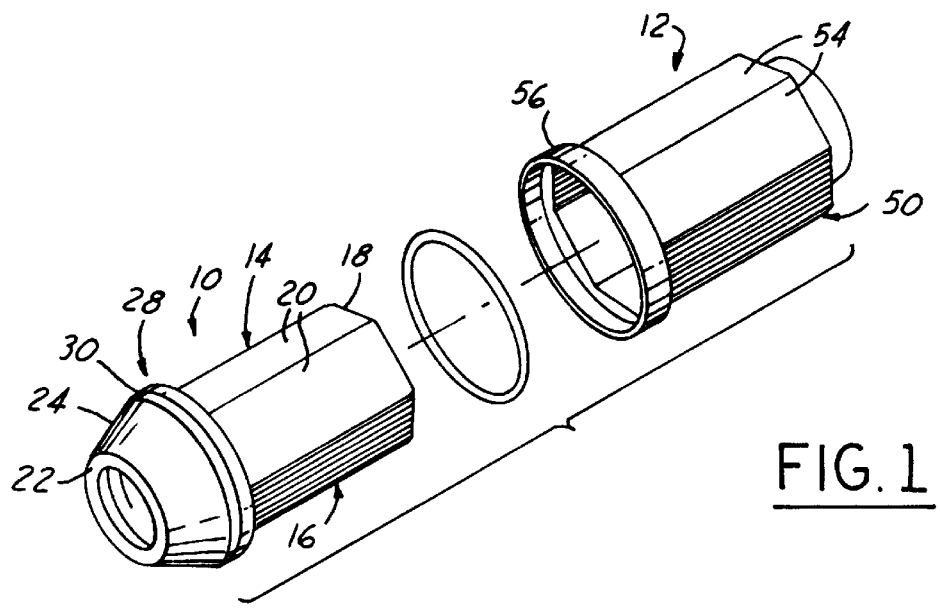
FIG. 1
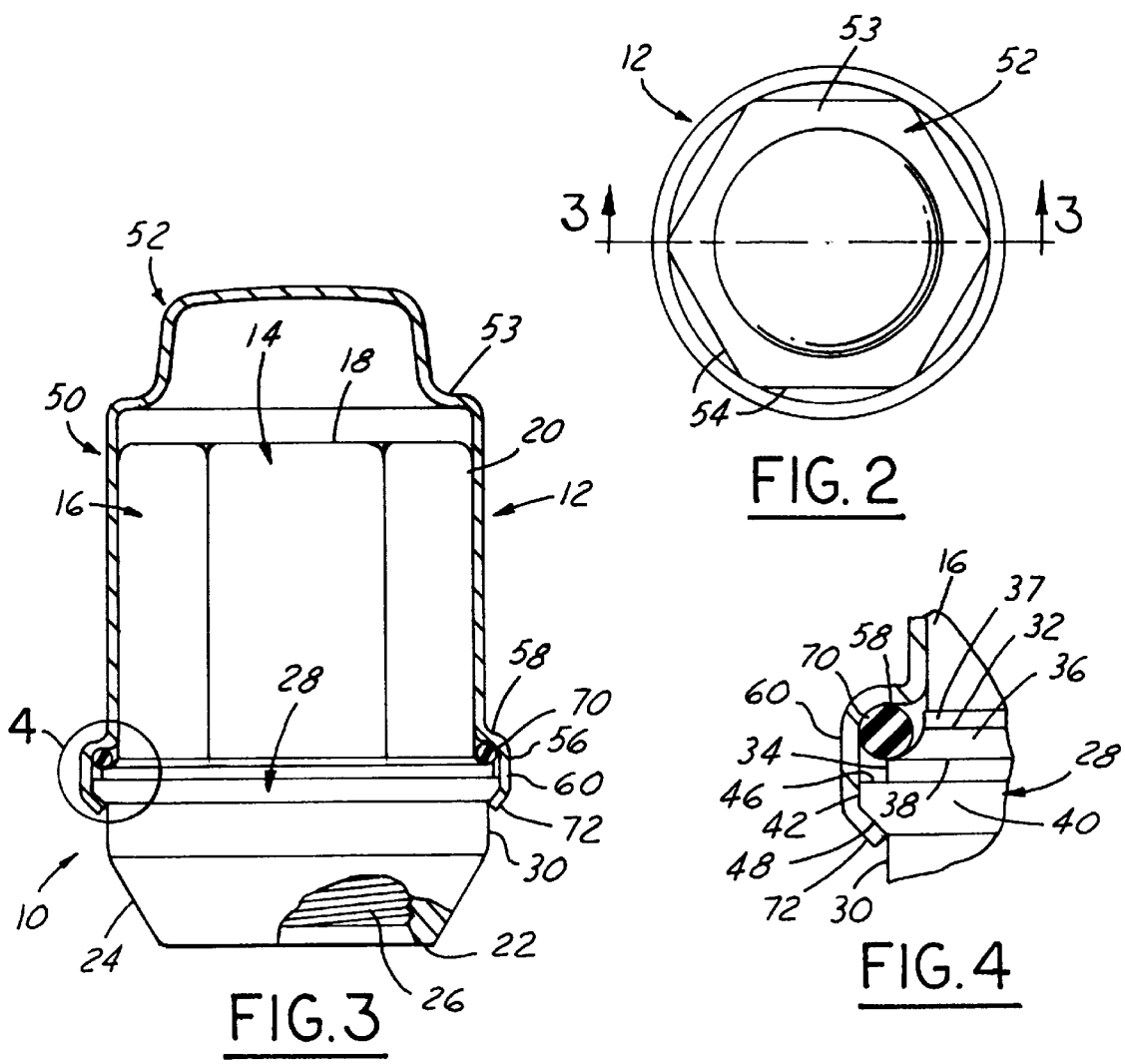
FIG. 2
FIG. 3
FIG. 4

CAPPED WHEEL NUT ASSEMBLY

This invention relates generally to wheel nut assemblies and more particularly to a wheel nut assembly having a cap secured on a nut.

BACKGROUND OF THE INVENTION

In the past, capped wheel nut assemblies have been made by welding the cap on the nut. Usually the nut is made of steel with a zinc plate and the cap is stainless steel. A welded joint between the nut and the cap is a corrosive site because of the different metals involved. These corrosive sites lead to weakening or failure of the bond. Elimination of the welded joint eliminates these corrosive sites. Elimination of the welded joint also prevents formation of stress risers in the cap.

As an alternative to a welded joint, an adhesive bond has been employed, of the type disclosed in U.S. Pat. No. 4,764,070. The adhesive bond insulates the two metals from each other and resists corrosion. The adhesive, however, must be capable of retaining its adhesive character over a very wide range of temperatures and also must not break down or allow moisture to enter between the nut and the cap. Moisture leads to corrosion and possible failure.

SUMMARY OF THE INVENTION

The wheel nut assembly of the present invention dispenses with both welding and adhesive. The parts are mechanically held together by crimping a marginal edge portion of the cap over an enlargement on the nut which effectively prevents the cap and nut from separating. To prevent moisture from entering the space between the cap and the nut, an O-ring seal is provided between the parts at the site where the marginal edge portion of the cap is crimped over the enlargement on the nut. The O-ring seal is compressed between the cap and the nut and excludes the entry of moisture. The O-ring seal may be made of any suitable compressible, resilient material such as natural or synthetic rubber, but preferably the O-ring seal is a silicone ring.

The present construction eliminates welding, which leads to corrosion and failure and also to unsightly weld marks which may show through the cap, and also eliminates the problems associated with the manufacture and use of wheel nuts and caps held together by an adhesive bond.

One object of this invention is to provide a capped wheel nut assembly having the foregoing features and capabilities.

Another object is to provide a capped wheel nut assembly which is rugged and durable in use and is capable of being inexpensively manufactured and assembled.

These and other objects, features and advantages of the invention will become more apparent as the following description proceeds, especially when considered with the accompanying drawings.

BRIEF DESCRIPTION OF THE DRAWINGS

FIG. 1 is an exploded view of a capped wheel nut assembly constructed in accordance with this invention.

FIG. 2 is a top plan view of the capped wheel nut assembly.

FIG. 3 is a sectional view taken on the line 3—3 in FIG. 2, with parts broken away and in elevation.

FIG. 4 is an enlargement of a portion of the assembly within the circle 4 in FIG. 3.

DETAILED DESCRIPTION OF THE PREFERRED EMBODIMENT

Referring now more particularly to the drawings, the capped wheel nut assembly comprises a wheel nut 10 and a cap 12.

The wheel nut 10 is in the form of an elongated tubular body 14. The body 14 has a main body portion 16 extending from the end 18 throughout a major portion of its length. The main body portion 16 has a polygonal side wall. More specifically, it is in the form of a six-sided regular polyhedron in which all six outer surfaces or flats 20 are identical and in which the angles between adjacent flats 20 are all equal. The flats 20 extend parallel to the longitudinal center line of the tubular body.

The nut body 14 is tapered at the outer end 22 to provide a frusto-conical seat 24 adapted to engage a complementary seating surface around a bolt on which the nut is threaded. The nut is interiorly threaded where indicated at 26 from its outer end 22 at least part way towards the opposite end of the nut body.

The nut body 14 has a circular enlargement 28 and an annular, cylindrical surface portion 30 between the seat 24 and the main body portion 16. The cylindrical surface portion 30 merges into and is of the same diameter as the large end of the frusto-conical seat 24.

The circular enlargement 28 has the configuration best shown in FIG. 4. Adjacent the main body portion 16, the enlargement 28 has an axially inner annular, circular portion 32 having a cylindrical surface 34 which is larger in diameter than the maximum diameter of the main body portion 16 measured across the juncture between the flats 20 thereof.

Extending from the axially inner edge of the cylindrical surface 34, the annular portion 32 has an annular concave surface 36 which merges into an annular stepped portion 37 which in turn merges into the main body portion 16. There is a sharp circular edge 38 where the cylindrical surface 34 and the radially outer extremity of the concave surface 36 meet.

Outwardly of the axially inner cylindrical portion 32 of the enlargement 28 is an axially outer cylindrical portion 40 which has a cylindrical surface 42 that is larger in diameter than the cylindrical surface 34 of the axially inner annular portion 32. The axially outer cylindrical portion 40 has an axially inner, annular, radial surface 46 which connects into the cylindrical surface 34 of the axially inner annular portion 32, and an axially outer annular surface 48 which tapers toward the outer end of the nut and connects into the cylindrical surface portion 30.

The cap 12 has an elongated side wall 50 and an end wall 52 closing the inner end of the cap. The outer end of the cap is open. The end wall 52 has a marginal portion 53 which is at right angles to the longitudinal centerline of the cap, and an outwardly domed central portion.

The side wall 50 of the cap is polygonal. More specifically, it is in the form of a regular six-sided polyhedron in which all six surfaces or flats 54 are identical and parallel to the longitudinal centerline of the side wall 50 and in which the angles separating the six flats are all equal. The inside dimensions of the side wall 50 are slightly larger than the outside dimensions of the main body portion 16 of the nut.

The side wall 50 of the cap at the open end terminates in a radially outwardly flared circular marginal portion 56 which has a radial outwardly extending flange 58 and a terminal cylindrical portion 60 concentric with the longitudinal centerline of the side wall.

An O-ring seal 70 provides a seal between the nut 10 and the cap 12. The O-ring seal preferably is of circular cross-section and may be made of a suitable flexible, resilient, compressible material such as natural or synthetic rubber. Preferably the O-ring seal is a silicone ring.

The O-ring seal 70 is slipped over the nut body 14 and placed on the concave arcuate surface 36. The cross-sectional width of the O-ring seal 70 is sufficiently large to overlap somewhat the sharp circular edge 38. The surface 36 provides a circular ledge or shelf supporting the seal 70.

The cap is assembled on the nut by sleeving it over the main body portion 16 to the point where the flange 58 of the marginal portion 56 of the side wall 50 of the cap engages and presses upon the O-ring seal 70 throughout a full 360°, substantially as shown in FIGS. 3 and 4. The marginal portion 56 of the cap encircles the enlargement 28 of the nut with the cylindrical portion 60 thereof contacting the radially outer surface 42 of the cylindrical portion 40 of the enlargement 28 throughout a full 360°. The cap is, of course, turned about its axis before assembly so that when assembled the flats and angles on the side wall 50 of the cap are aligned with and confront the flats and angles on the main body portion 16 of the nut.

To complete the assembly, the outer edge portion 72 of the cylindrical portion 60 of the outwardly flared marginal portion 56 of the cap is mechanically crimped over the enlargement 28 so as to press radially inward and bear against the tapered surface 48 of the enlargement.

The mechanical clinching of the parts together by crimping of the outer edge portion 72 of the marginal portion of the cap over the enlargement 28 on the nut improves axial retention and reduces stress concentration. It also compresses the O-ring seal 70 radially inwardly and axially outwardly to press it against the arcuate surface or shelf 36 and also against the sharp edge 38. A sufficiently tight annular seal between the nut at these points and the flange 58 and cylindrical portion 60 of the outwardly flared marginal portion 56 of the cap is thus provided throughout 360°, preventing the entry of moisture into the space between the nut and the cap.

Because the edge 38 of the shelf 36 is spaced radially inwardly of the cylindrical surface 42 of the outer cylindrical portion 40 of the enlargement 28, it is possible for the O-ring seal 70 to be pressed tightly against the edge 38 to substantially increase the sealing action of the O-ring seal.

What is claimed is:

1. A capped wheel nut assembly comprising:

a metal nut and a metal cap, said nut having an elongated internally threaded body provided with a polygonal side wall extending from an inner end thereof toward an outer end thereof, said cap having an elongated annular side wall of substantially the same polygonal form as the side wall of said nut body, said cap having an end wall closing an inner end thereof and being open at an outer end thereof, said cap being sleeved over said nut body with its side wall surrounding the side wall of said nut body and with its end wall overlying the inner end of said nut body, said nut body having a circular enlargement adjacent to but spaced from the outer end thereof, the side wall of said cap having an axially outwardly flared marginal portion at its open end crimped over said enlargement, and an O-ring seal compressed between said enlargement of said nut body and said flared marginal portion of said cap to provide an annular seal throughout 360° preventing entry of moisture between said cap and said nut.

2. A capped wheel nut assembly as defined in claim 1, wherein said enlargement has an axially inner annular, circular shelf portion, said enlargement has an axially outer cylindrical portion of larger diameter than said shelf portion, said flared marginal portion of said cap is crimped over said axially outer cylindrical portion of said enlargement, and said O-ring seal is compressed between said shelf portion of the nut body and the flared marginal portion of the cap.

3. A capped wheel nut assembly as defined in claim 2, wherein said shelf portion has an annular concave surface terminating radially outwardly in a sharp circular edge, and said O-ring seal is compressed against said concave surface and sharp edge of said shelf portion.

4. A capped wheel nut assembly as defined in claim 3, wherein said O-ring seal is a silicon ring.

* * * * *